Sept. 11, 1934.    H. B. REDDING    1,973,658
TIEBAR AND SEAL FOR METER CONNECTIONS
Filed Oct. 10, 1933
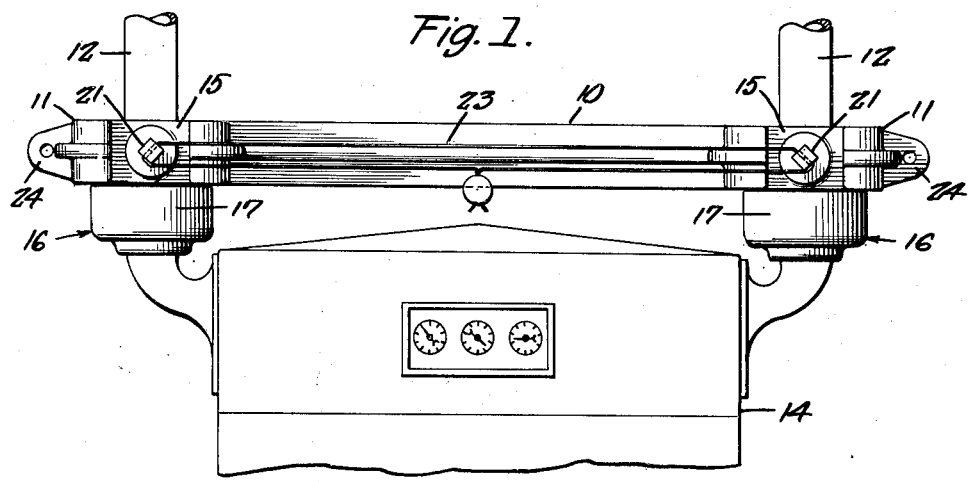
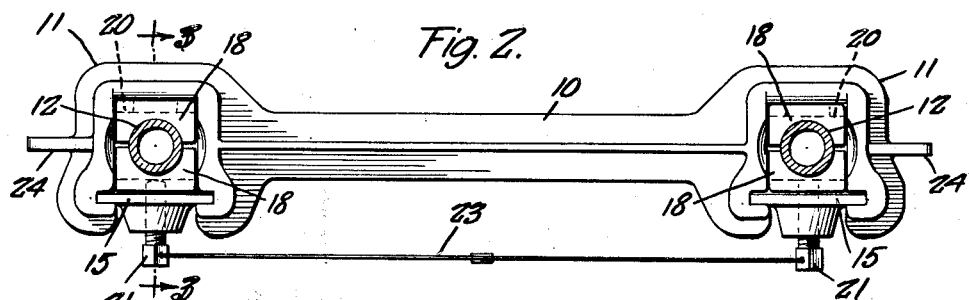
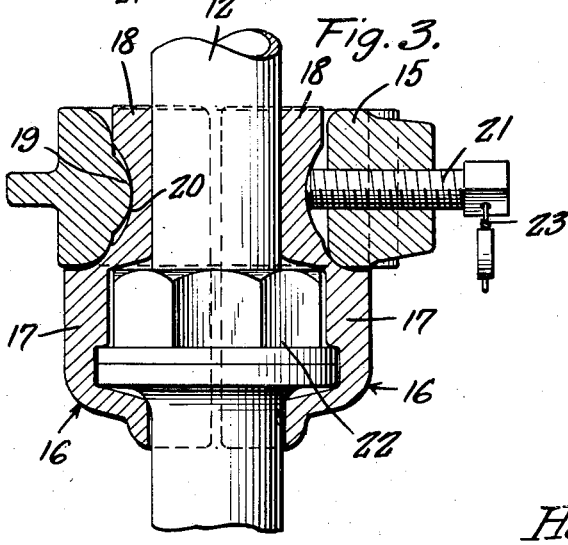
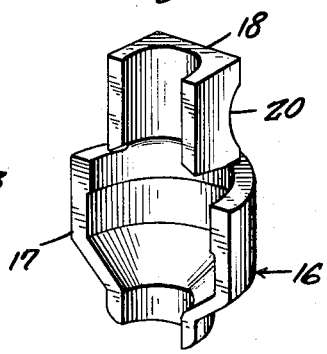
Harry B. Redding,
INVENTOR Patented Sept. 11, 1934

1,973,658

UNITED STATES PATENT OFFICE 1,973,658

TIEBAR AND SEAL FOR METER CONNECTIONS

Harry B. Redding, Columbus, Ohio

Application October 10, 1933, Serial No. 693,035

8 Claims. (Cl. 70—122)

The object of the invention is to provide a tie bar for meter connections of such form that it need not be applied until after the meter has been coupled to its connecting pipes, when it will act as a permanent spacer for the latter and thus preclude lateral strain on the meter fittings; to provide a tie bar construction for the purpose indicated which will serve as a means for simultaneously enclosing the unions effecting connection between the pipes and the meter; and generally to provide a device of the kind indicated which is of simple form and therefore susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

In the drawing:

Figure 1 is a front elevational view of a gas meter and the attached portions of its connecting pipes showing the invention applied in operative position.

Figure 2 is a top plan view of the structure of Figure 1.

Figure 3 is a sectional view on the plane indicated by the line 3—3 of Figure 2.

Figure 4 is a perspective view of one of the shoes.

The tie bar 10 constituting an element of the invention is formed with terminal yoke members 11 which may be arranged in embracing relation to the pipe 12 through which gas enters and leaves the meter 14. The yoke members, at the open side, are slotted for the reception of thrust plates 15 which not only close the open sides of the yoke members but serve as means for holding in position in the yoke members the shoes 16 which are formed with coupling embracing portions 17 and pipe embracing portions 18. The shoes 16 are arranged in pairs, the two shoes being identical and the pipe engaging portions being received in the yoke members which are internally ribbed, as indicated at 19. The ribs enter the clearance spaces 20 formed on the pipe engaging portions of the shoes, so as to prevent relative movement of the shoes and tie bar axially of the pipes 12.

The thrust plates 15 are provided with set screws 21 which bear upon the shoes facing the open sides of the yoke members, when the device is in attached position to a meter and its connecting pipes, the set screws bearing in the recess 20 of the shoes. When attached, the union embracing portions 17 of the shoes enclose the unions 22 by which connection between the meter and the pipes 12 is effected. Thus when the set screws are seated, they not only function to hold the shoes in firm engagement with the pipes 12 but also function to hold the thrust plates in position and thus to rigidly secure the yoke members to the shoes and thereby to rigidly secure the tie bar to the pipes 12, the connecting unions at the same time being completely enclosed, so they may not be disturbed without breaking the sealing wire 23 which connects the two set screws 21 through holes or openings formed in their heads.

The meter supporting shelf may be swung from the yoke members by hangers which may be attached to the perforated ears 24 with which the yoke members are formed.

The pipe engaging portions 18 of the shoes fit their seats in the yoke members loosely, so that exact parallelism and invariable spacing of the pipes 12 is not necessary in order to attach the tie bar after the connection of the meter with the pipes has been effected.

By reason of the tie bar engaging the shoes and the latter being formed with pipe engaging elements, the device performs the double function of enclosing the meter connecting unions and forming a rigid connection between the pipes entering and leaving the meter. The thrust plates and their set screws provide quick and convenient means for effecting rigid connection between the shoes and the tie bar and the whole device is of a character that makes its attachment possible after the installation of the meter and with a minimum amount of time and effort on the part of the user.

The invention having been described, what is claimed as new and useful is:

1. A device for the purpose indicated comprising a tie bar formed with terminal members for disposition in embracing relation to the spaced pipes entering a gas meter, shoes arranged in pairs in said members and enclosing the unions effecting connection between the pipes and the meter, and means for locking the shoes in said members to maintain the shoes in enclosing position to the unions and the tie bar rigidly secured to the pipes.

2. A device for the purpose indicated comprising a tie bar formed with terminal members for disposition in embracing relation to the spaced pipes entering a gas meter, shoes arranged in pairs in said members and enclosing the unions effecting connection between the pipes and the meter, and means for locking the shoes in said members to maintain the shoes in enclosing position to the unions and the tie bar rigidly secured to the pipes, each shoe having a pipe embracing element complemental to the pipe embracing element of the companion shoe and said locking means firmly engaging the pipe embracing elements with the pipes.

3. A device for the purpose indicated comprising a tie bar formed with terminal members for disposition in embracing relation to the spaced pipes entering a gas meter, shoes arranged in pairs in said members and enclosing the unions effecting connection between the pipes and the meter, and means interlocked with said members and with one of the shoes therein to maintain the members in enclosing position to the unions and the tie bar rigidly secured to the pipe.

4. A device for the purpose indicated comprising a tie bar formed with terminal yoke members interiorly formed with seats, shoes arranged in pairs in said seats and enclosing the unions effecting connection between the pipes and the meter, and means for locking the shoes in said seats to maintain the shoes in enclosing position to the unions and the tie bar rigidly secured to the pipes.

5. A device for the purpose indicated comprising a tie bar formed with terminal yoke members interiorly formed with seats, shoes arranged in pairs in said seats and enclosing the unions effecting connection between the pipes and the meter, and members having interlocking connections with said yoke members and being provided with shoe engaging means to maintain the shoes in enclosing position to the unions and tie bar rigidly secured to the pipes.

6. A device for the purpose indicated comprising a tie bar formed with terminal yoke members for disposition in embracing relation to the spaced pipes entering a gas meter, pairs of shoes of which each comprises a pipe engaging portion and a union enclosing portion, the union enclosing portion of each pair of shoes surrounding the unions effecting connection between the pipes and the meter and the pipe engaging portions engaging the connecting pipes on diametrically opposite sides, the pipe engaging portions of the shoes being received in said yoke members, and thrust plates having interlocking connections with said yoke members and set screws bearing upon the shoes.

7. A device for the purpose indicated comprising a tie bar formed with terminal yoke members for disposition in embracing relation to the spaced pipes entering a gas meter, pairs of shoes of which each comprises a pipe engaging portion and a union enclosing portion, the union enclosing portion of each pair of shoes surrounding the unions effecting connection between the pipes and the meter and the pipe engaging portions engaging the connecting pipes on diametrically opposite sides, the pipe engaging portions of the shoes being received in said yoke members, and thrust plates having interlocking connections with said yoke members and set screws bearing upon the shoes, the yoke members being ribbed on the interior surface and the shoes being recessed to provide clearance spaces for the ribs to prevent relative movement of the yoke members and shoes axially of the pipes.

8. A device for the purpose indicated comprising a tie bar formed with terminal yoke members for disposition in embracing relation to the spaced pipes entering a gas meter, shoes received in said yoke members and arranged in pairs therein, the shoes having union enclosing portions for enclosing the unions effecting connection between the pipes and the meter, the shoes also having pipe engaging portions, the yoke members at the open side being slotted, thrust plates mounted in said slots, and set screws threaded through the thrust plates and bearing upon one of the pipe engaging portions of each pair of shoes.

HARRY B. REDDING.